| United States Patent [19] | [11] Patent Number: 4,824,990 |
|---|---|
| Mertz et al. | [45] Date of Patent: Apr. 25, 1989 |

[54] COPOLYESTER PLASTICIZERS FOR POLYVINYL CHLORIDE

[75] Inventors: William J. Mertz, Cincinnati; Robert J. Braun, Batavia, both of Ohio

[73] Assignee: National Distillers and Chemical Corporation, New York, N.Y.

[21] Appl. No.: 41,503

[22] Filed: Apr. 23, 1987

Related U.S. Application Data

[63] Continuation-in-part of Ser. No. 863,634, May 15, 1986, abandoned.

[51] Int. Cl.$^4$ .................................... C07C 69; C07C 80
[52] U.S. Cl. ......................................... 560/90; 524/310; 540/89; 540/91
[58] Field of Search ...................... 560/89, 90, 91, 199

[56] References Cited

U.S. PATENT DOCUMENTS

| 2,647,099 | 7/1953 | Smith | 560/199 X |
|---|---|---|---|
| 3,202,701 | 8/1965 | Young et al. | 560/199 |
| 3,331,802 | 7/1967 | Huber et al. | 560/90 X |
| 4,122,057 | 10/1978 | Lamont et al. | 560/90 X |

*Primary Examiner*—Werren B. Lone
*Assistant Examiner*—Vera C. Clarke
*Attorney, Agent, or Firm*—Kenneth D. Tremain; Gerald A. Baracka

[57] ABSTRACT

Copolyester plasticizers useful for the formulation of PVC refrigerator gaskets which exhibit improved resistance to migration and marring and improved processing characteristics are provided. The copolyesters are obtained by reacting an acid component consisting of a mixture of a benzene dicarboxylic acid (or anhydride or methyl ester thereof) and an aliphatic $C_{5-12}$ saturated dicarboxylic acid (or methyl ester) with an alcohol component consisting of a mixture of neopentyl glycol and ethylene glycol. An aliphatic $C_{6-13}$ saturated monofunctional alcohol or aliphatic $C_{6-13}$ saturated monocarboxylic acid terminating agent is also included in the reaction.

20 Claims, No Drawings

COPOLYESTER PLASTICIZERS FOR POLYVINYL CHLORIDE

CROSS REFERENCE TO RELATED APPLICATION

This is a continuation-in-part of U.S. application Ser. No. 863,634 filed May 15, 1986, now abandoned.

BACKGROUND OF THE INVENTION

1. Field of the Invention

The present invention relates to improved copolyester plasticizer compositions useful for the formulation of PVC refrigerator gaskets which exhibit good resistance to migration and marring and improved processing characteristics.

2. Description of the Prior Art

For a compound is to be an effective plasticizer for PVC and impart the desired softening, flexibilizing and toughening, the material must have some mobility within the PVC resin. If this mobility is not properly controlled, however, the plasticizer can migrate into other resins with which the plasticized PVC comes in contact.

Migration of PVC plasticizers into high impact polystyrene and acrylonitrile-butadiene-styrene (ABS) resins is a particular problem. Many of the ester compounds commonly used for the plasticization of PVC mar the surface of the polystyrene or ABS in those regions where the resins come into contact with the plasticized PVC. In severe cases, stress cracking of the polystyrene and ABS resulting in rapid and catastrophic failure of the resin can occur.

Various polyester compositions have been developed to overcome the above-described problems. These polyesters are typically derived from branched-chain diols and aliphatic dicarboxylic acids. Viscosities are controlled by the use of conventional monocarboxylic acid or monofunctional alcohol terminators. Whereas acceptable migration characteristics can be achieved with these polyesters, the plasticizers are more expensive than polyesters based on phthalates and ethylene glycol. Copolyesters containing phthalates and copolyesters wherein all or a portion of the propylene glycol is replaced with ethylene glycol have heretofore been found to have unacceptable mar characteristics.

Williams et al., U.S. Pat. No. 3,972,962 discloses chain-terminated non-migrating polyester plasticizers for PVC derived from aliphatic saturated dicarboxylic acids and branched-chain glycols. An aromatic monocarboxylic acid is necessarily employed as a chain terminator to obtain the desired balance of plasticizer properties.

Aylesworth et al. in U.S. Pat. Nos. 3,501,554 and 3,595,824 disclose non-chain terminated polyester plasticizers for PVC fabrics obtained by the reaction of two or more alkanedioic acids having from 4 to 12 carbon atoms with two or more alkylene glycols having from 2 to 6 carbon atoms. The Aylesworth et al. plasticizer compositions exhibit superior resistance to drycleaning solvents, such as perchloroethylene.

Lamont et al. U.S. Pat. No. 4,122,057 discloses polyesters which are terminated with a mixture of an aliphatic monobasic acid and a monofunctional alcohol. As a result of this mixed-termination, plasticizers having improved low temperature properties are obtained.

Copolyester plasticizers and a process for their production are also described in Uno et al., U.S. Pat. No. 4,065,439. The copolyesters of Uno et al. are derived from terephthalic acid, isophthalic acid, a $C_{6-9}$ aliphatic dicarboxylic acid, ethylene glycol, and neopentyl glycol. These copolyesters are solid materials primarily useful as hot-melt type adhesives, however, they may also be used for paints, surface treating agents, binders and plasticizers.

U.S. Pat. No. 3,700,957 to Daniels discloses polyester compositions having both flame retarding and plasticizing properties obtained by the reaction of a dicarboxylic acid, a glycol and 2,3-dibromomethyl-1,3-propanediol. The polyesters may be terminated with an alkanoic acid or alkanol chain terminator.

Other polyester plasticizers derived from diols and dicarboxylic acids are disclosed in Small et al., U.S. Pat. Nos. 2,555,062; Wilkinson et al., 2,815,354; and Walus, 3,850,871.

It would be highly advantageous if non-migrating polyester plasticizers suitable for use in PVC resins and which exhibit good plasticization efficiency so that they can be utilized at low levels could be produced from low cost and readily available reactants. It would be even more desirable if these plasticizers impart desirable processing characteristics to the PVC resin and exhibited reduced tendency to mar polystyrene and ABS resins. These and other advantages are realized with the improved copolyester plasticizers of the present invention.

SUMMARY OF THE INVENTION

The improved copolyester plasticizer compositions of the present invention have average molecular weights from about 500 to 2000, kinematic viscosities (100° F.) from about 600 to about 2000 centistokes and are obtained by reacting a mixture containing a benzene dicarboxylic acid or anhydride or methyl ester thereof and an aliphatic saturated dicarboxylic acid having from 5 to 12 and, more preferably, 5 to 9 carbon atoms or methyl ester thereof with a mixture of neopentyl glycol and ethylene glycol, and a terminating agent. The terminating agent can be an aliphatic saturated monofunctional alcohol having from 6 to 13 carbon atoms or an aliphatic saturated monocarboxylic acid having from about 6 to 13 carbon atoms or mixtures thereof.

To obtain the copolyesters essentially stoichiometric amounts of acid and alcohol components are reacted to an acid value less than about 3 and hydroxyl value less than about 25. To aid in driving the reaction essentially to completion, a slight excess of ethylene glycol and/or monofunctional alcohol may be employed. About 40 to 60 equivalent percent aliphatic saturated dicarboxylic acid and 40 to 60 equivalent percent benzene dicarboxylic acid, based on the total acid equivalents, are reacted. Ethylene glycol is generally reacted in an amount from about 30 to about 60 equivalent percent and neopentyl glycol is reacted in an amount from about 30 to 60 equivalent percent, based on the total alcohol equivalents. About 8 to 30 equivalent percent monofunctional alcohol, based on the total alcohol equivalents, or about 8 to 30 equivalent percent monocarboxylic acid, based on the total acid equivalents, is generally reacted. The copolyesters are advantageously utilized to plasticize PVC homopolymer and copolymer resins and are generally employed in amounts ranging from 30 to about 150 phr.

DETAILED DESCRIPTION OF THE INVENTION

The improved copolyester plasticizers of the present invention are the reaction product of essentially stoichiometric amounts of a mixed acid component and a mixed alcohol component. As used herein, the acid component includes anhydrides or methyl esters. The acid mixture contains one or more aliphatic saturated dicarboxylic acids and a benzene dicarboxylic acid. The alcohol component is a mixture of ethylene glycol and neopentyl glycol. An aliphatic monofunctional alcohol or aliphatic monocarboxylic acid is used as a chain terminator. It will be understood that anhydrides and methyl esters may be substituted for the various carboxylic acids and, in some instances, will be advantageous.

Aliphatic saturated dicarboxylic acids utilized for the preparation of copolyesters contain from 5 to 12 carbon atoms. Representative dicarboxylic acids include glutaric acid, adipic acid, pimelic acid, suberic acid, azelaic acid, sebacic acid, dodecanedioic acid, and mixtures thereof. Other aliphatic dicarboxylic acids outside the specified carbon content range may be present in limited quantities. Methyl esters of the aliphatic dicarboxylic acids may be advantageously utilized. Highly efficient plasticizer compositions are obtained when glutaric acid, adipic acid, azelaic acid or mixtures wherein these acids are the predominant acids are employed for the preparation of the copolyesters.

In a particularly useful embodiment of this invention, methyl esters of mixed dicarboxylic acids wherein the predominant dicarboxylic acids are glutaric acid and adipic acid and which are obtained as a co-product stream from the production of adipic acid are utilized. The ratio of dimethyl glutarate to dimethyl adipate in these mixtures typically ranges from 4:1 to 1:1 and, most generally, is from 3.5:1 to 2:1.

A benzene dicarboxylic acid is utilized in conjunction with the above-described aliphatic dicarboxylic acids or methyl esters. The benzene dicarboxylic can be the ortho-, meta-, or para-isomer, i.e., phthalic acid, isophthalic acid, or terephthalic acid. The ortho and para derivatives are generally preferred. As with the aliphatic dicarboxylic acids, methyl esters of the benzene dicarboxylic acids may also be used. It will be also understood by those skilled in the art that the anhydride of phthalic acid can also be utilized for the preparation of the copolyester products. In a particularly useful embodiment of the invention wherein copolyesters having superior resistance to marring are obtained, dimethyl terephthalate is employed.

A hydroxylic component is reacted with the above-described mixture of acids to obtain the useful copolyester plasticizers of this invention. This alcohol component contains ethylene glycol and neopentyl glycol, present in a prescribed ratio.

A monofunctional alcohol or monocarboxylic acid is also necessarily present as a chain-stopper, i.e., terminator. Branched-chain or linear aliphatic saturated monofunctional alcohols or monocarboxylic acids having from 6 to 13 carbon atoms and, more preferably, 8 to 10 carbon atoms are utilized for this purpose. Representative monofunctional alcohols include 2-ethylhexanol, isooctyl alcohol, isodecyl alcohol, tridecyl alcohol, n-hexanol, n-octanol, n-decanol, and the like or mixtures thereof. Representative monocarboxylic acid terminators include 2-ethylhexanoic acid, octanoic acid, pelargonic acid, isoheptanoic acid, decanoic acid, and the like or mixtures thereof. Mixtures of alcohol and acid terminators may also be advantageously used.

Although the individual reactants employed to obtain the improved plasticizers of this invention are known for the preparation of polyesters, the present copolyester compositions are novel as a result of the particular combination of these reactants and the unique and unexpected properties obtained thereby. Whereas the skilled artisan would expect migration and resistance to marring to be unacceptable as a result of the introduction of an aromatic acid and substitution of ethylene glycol for a portion of the neopentyl glycol, this is not the case. Applicants have quite unexpectedly found that both aromatic acids and ethylene glycol can be advantageously utilized to reduce the cost of the product while obtaining acceptable migration properties. This is accomplished by judicious selection of the dicarboxylic acids, hydroxylic compounds, and the ratio of thes reactants. The superior migration properties and resistance to marring obtained with the present copolyester products are even more more unexpected in view of the relatively low molecular weight of these products. Also, the improved processing characteristics of PVC plasticized with the resulting copolyesters is totally unexpected.

To obtain the improved copolyester plasticizers essentially stoichiometric amounts of the acid component and the alcohol component are reacted. The aliphatic saturated dicarboxylic acid comprises from about 40 to about 60 equivalent percent of the total acid equivalents and the benzene dicarboxylic acid constitutes from about 40 to about 60 equivalent percent of the total acid equivalents. The ethylene glycol is present in an amount from about 30 to about 60 equivalent percent, based on the total equivalents of alcohol in the mixture. Neopentyl glycol is present in an amount from about 30 to about 60 equivalent percent, based on the total alcohol equivalents. The aliphatic saturated monofunctional alcohol or monocarboxylic acid terminator is employed in an amount from about 8 to about 30 equivalent percent, based on the total equivalents of alcohol or acid.

The resulting copolyesters generally have average molecular weights in the range 500 to about 2000. Most usually, the average molecular weight ranges from 700 to about 1400. Molecular weights referred to herein are number average molecular weights determined by gel permeation utilizing conventional standards. The copolyesters have 100° F. kinematic viscosities in the range 600 to about 2000 centistokes and, more generally, in the range 900 to 1300 centistokes. The acid value of the products is generally 3 or less and the hydroxyl value is generally 25 or less.

The copolyesters are prepared using known esterification and transesterification techniques. Reaction of the acid and alcohol components to obtain the desired copolyesters is carried out in standard equipment using conventional procedures. Typically, all of the reactants are charged to a suitable kettle and heated at atmospheric pressure at temperatures on the order of about 150°–250° C. for a period of time sufficient to substantially complete the reaction. A catalyst may be included with the reactant charge. The reaction is driven to completion by distillation under reduced pressure (typically 2–50 mm Hg absolute at 200°–250° C.) until the desired amount of water or methanol is obtained. The distillation under vacuum removes the final traces of water or methanol, any excess glycol and also small amounts of other volatile materials. The plasticizer is then cooled and is normally ready for use. As a practical matter, if the methyl esters of aliphatic acids are employed, the aromatic acid will also be utilized as the methyl ester.

If an improvement in color is desired, the product may be bleached by any of the well known and accepted bleaching methods, e.g., using hydrogen peroxide or hypochlorite. Alternatively, the copolyester can be decolorized by filtering through a filter aid, charcoal or bleaching clay.

Whereas the reaction may be carried out without use of a catalyst, where shorter reaction times are desired, a catalyst may be advantageous. Known catalysts, such as phosphoric acid, p-toluene sulfonic acid, stannous oxalate, alkyltin oxides, or the like can be utilized in small amounts and facilitate the reaction. When the reaction is complete, the catalyst may be deactivated or removed by filtering or other conventional means. Catalysts are particularly advantageous for the transesterification reactions.

Inert diluents such as benzene, toluene, xylene, and the like can be employed for the reaction, however, they are not necessary. In fact, it is generally considered to be desirable to conduct the reaction without diluents since the copolyester can be used directly as it is obtained from the reactor.

The copolyester plasticizer compositions of the present invention are useful plasticizers for PVC homopolymers and PVC copolymers wherein one or more other ethylenically unsaturated monomers is copolymerized with vinyl chloride. Comonomers useful in the preparation of the polyvinyl chloride copolymers include: vinyl bromide; vinyl acetate; vinylidene chloride; lower allyl esters; vinyl alkyl ethers; acrylonitrile and methacrylonitrile; acrylic acid and methacrylic acid; acrylic and methacrylic esters such as methyl acrylate, ethyl acrylate and methyl methacrylate; styrene; and the like. The copolyesters are particularly useful with copolymers of vinyl chloride with vinyl acetate, vinyl chloride with vinyl butyrate, vinyl chloride with vinyl propionate, vinyl chloride with methyl methacrylate, vinyl chloride with vinylidene chloride and vinyl chloride with two or more comonomers, such as mixtures of vinylidene chloride and 2-ethylhexylacrylate, particularly when the copolymers contain 75 percent by weight or more bound vinyl chloride.

The amount of copolyester used can be widely varied and will range from about 30 up to about 150 parts by weight per 100 parts by weight of the vinyl chloride homopolymer or copolymer. In a particularly useful embodiment of the invention where the copolyester is utilized for the plasticization of PVC refrigerator gaskets, from about 60 to 110 parts by weight plasticizer per 100 parts resin is utilized. The copolyesters can be utilized in combination with other plasticizers. When combined with other plasticizers, the total amount of plasticizer will generally fall within the above-prescribed ranges.

The copolyesters of this invention are also compatible with other known compounding ingredients commonly employed in the formulation of PVC. Such ingredients include stabilizers to protect the resin from the deleterious effects of oxidative, thermal and photochemical degradation, fillers, pigments, dyes, lubricants, and other processing aids. As is evident to those skilled in the art of compounding and formulating PVC, the type and amount of compounding ingredients used will be determined by the physical properties desired.

In spite of the superior plasticization efficiency of the copolyester compositions of this invention for PVC homopolymers and copolymers, the products have reduced affinity for polystyrene and ABS resins and therefore exhibit little tendency to migrate into these resins when they come into contact with PVC plasticized therewith. In one embodiment of the invention, copolyesters which have superior resistance to marring of polystyrene and ABS resins are obtained utilizing dimethyl terephthalate. It is particularly advantageous if the acid component is a mixture of dimethyl terephthalate and mixed methyl esters of aliphatic dicarboxylic acids obtained as a co-product from the manufacture of adipic acid.

The following examples illustrate the invention more fully. They are not, however, intended as a limitation on the scope thereof. In the examples all weights and percentages are on a weight basis unless otherwise indicated.

EXAMPLE I

A typical copolyester plasticizer was prepared by reacting the following:

| Reactant | Equivalent Percent |
| --- | --- |
| Azelaic Acid | 24.8 |
| Adipic Acid | 24.8 |
| Phthalic Anhydride | 50.4 |
| Ethylene glycol* | 35.0 |
| Neopentyl glycol | 35.0 |
| 2-Ethylhexanol* | 30.0 |

*The charge contained 1.2-fold excesses of the volatile hydroxyl components (ethylene glycol and 2-ethylhexanol) to aid in driving the reaction to completion.

The above ingredients were charged to a three-necked, round bottom flask equipped with a suitable agitator, a thermometer, and a medium length Vigreaux distillation column and condenser. The condenser was arranged so that material could be distilled from the reaction at either atmospheric or reduced pressure. A small amount $H_3PO_2$ (0.01 weight percent) and dibutyltin diacetate (0.03 weight percent) were added to the reactor and the reaction mixture heated to 225°-235° C. while removing water of reaction. The temperature was maintained until the reaction slowed, as evidenced by a marked reduction in the rate of water evolution. At this point, a vacuum was applied. The pressure was gradually reduced to a final pressure of about 2 mm Hg with the temperature at 225°-250° C. so that controlled distillation of the volatile components (water and excess alcohol) was achieved. The reaction was followed by measuring the acid value (AV) of the reaction mixture and terminated when the AV was less than 0.5. The reaction mixture was then cooled to room temperature and filtered using a diatomaceous earth filter aid to remove catalyst and other impurities. The final copolyester product had an average molecular weight of 922, AV of 0.3, hydroxyl value (OHV) of 15.7 and kinematic viscosities at 100° F. and 210° C. of 1218 cSt and 105 cSt, respectively. The clear, essentially colorless liquid was useful as a plasticizer without further modification or processing and was readily incorporated into PVC resin homopolymers and copolymers using conventional processing equipment to produce clear pliable sheets.

A standard PVC resin formulation was prepared in accordance with the following recipe:

|  | PHR |
|---|---|
| PVC resin (GEON 102) | 100 |
| Barium-Cadmium Stabilizer (FERRO 1820) | 2 |
| Phosphite Stabilizer (FERRO 904) | 1 |
| Copolyester Plasticizer | 67 |

The ingredients were milled for about 10 minutes on a standard two-roll rubber mill (6×12 inch rolls heated to about 170° C. and set for a sheet thickness of about 0.25 inch). Sheets of uniform 20 mil thickness were then prepared by pressing using a chrome-plated ASTM mold at about 177° C. for 6 minutes at 1500 psi. Test specimens were cut from the pressed sheet and physical properties determined using conventional test methods. Properties of the plasticized resin were as follows:

| Elongation (%) | 290 |
|---|---|
| 100% Modulus (psi) | 1623 |
| Tensile Strength (psi) | 3350 |
| Shore "A" Hardness | 86/82 |
| Roll Spew (5 hours at RT) | None |
| Brittle Point (°C.) | −5 |
| Extraction (percent weight loss): | |
| Soapy Water (90° C.; 24 hours) | 4.4 |
| Oil (50° C.; 24 hours) | 1.1 |
| Hexane (25° C.; 24 hours) | 1.2 |

The above data shows that excellent physical properties are obtained for the PVC plasticized with the copolyester of the present invention.

EXAMPLE II

To demonstrate the ability to vary the composition, Example I was repeated using the following reactant charge:

| Reactant | Equivalent Percent |
|---|---|
| Azelaic Acid | 24.8 |
| Adipic Acid | 24.8 |
| Phthalic Anhydride | 50.4 |
| Ethylene glycol | 37.5 |
| Neopentyl glycol | 37.5 |
| 2-Ethylhexanol | 25.0 |

A slight excess of ethylene glycol and 2-ethylhexanol was employed. The resulting copolyester composition had an average molecular weight of 1850, an AV of 0.3, OHV of 17.3, 100° F. and 210° F. kinematic viscosities of 2005 cSt and 183 cSt, respectively. Plasticized PVC formulated in accordance with the recipe of Example I had the following properties:

| Elongation (%) | 280 |
|---|---|
| 100% Modulus (psi) | 1650 |
| Tensile Strength (psi) | 3400 |
| Shore "A" Hardness | 87/83 |
| Roll Spew (5 hours at RT) | None |
| Brittle Point (°C.) | −3 |
| Extraction (percent weight loss): | |
| Soapy Water (90° C.; 24 hours) | 3.0 |
| Oil (50° C.; 24 hours) | 1.0 |
| Hexane (25° C.; 24 hours) | 1.0 |

EXAMPLE III

For comparative purposes, a copolyester derived solely from aliphatic dibasic acids and a mixture of neopentyl glycol and propylene glycol of the type typically utilized commercially for the formulation of PVC refrigerator gaskets was prepared from the following reactants:

| Reactant | Equivalent Percent |
|---|---|
| Adipic Acid | 45.5 |
| Azelaic Acid | 45.0 |
| Mixed C$_{8-20}$ Monocarboxylic Acids | 9.0 |
| Neopentyl glycol | 50.0 |
| Propylene glycol | 50.0 |

The reaction was carried out following the procedure of Example I and a slight excess of propylene glycol was employed as an aid in driving the esterification reaction toward completion. The resulting copolyester had an AV of 0.3, OHV of 20.0, and 100° F. and 210° F. kinematic viscosities of 1637 cSt and 122 cSt, respectively.

EXAMPLE IV

PVC refrigerator gasket formulations were prepared using the copolyester product of this invention prepared in Example I and the typical prior art copolyester product prepared in Example III. The resin formulations were prepared in accordance with the following recipe:

|  | PHR |
|---|---|
| VYGEN 112 PVC | 100.0 |
| Calcium Carbonate | 50.0 |
| Epoxidized Soya | 5.0 |
| Titanium Dioxide | 1.5 |
| Stabilizer (Ba—Cd soaps and phosphite)/Fungicide Package | 5.8 |
| Plasticizer | 95.0 |

The ingredients were blended on a standard two-roll mill as described in Example I and physical properties of the plasticized resins determined. The properties of the vinyl formulation were as follows:

|  | Plasticizer of Ex. I | Plasticizer of Ex. III |
|---|---|---|
| Elongation (%) | 330 | 370 |
| 100% Modulus (psi) | 640 | 450 |
| Tensile Strength (psi) | 1875 | 1325 |
| Roll Spew (5 hours at RT) | None | None |
| Brittle Point (°C.) | −7 | −28 |
| Extraction (percent weight loss): | | |
| Water (48 hours; 150° F.) | 0.5 | 0.6 |
| WESSON Oil (48 hours; RT) | 0.6 | 2.5 |
| JOY (48 hours; 150° F.) | 1.5 | 0.9 |

It is apparent from the above data that physical properties obtained for the resin formulation containing the plasticizer of Example I are comparable to those obtained using the commercial plasticizer of Example III. Furthermore, both formulations exhibited comparable resistance to migration and resistance to marring of ABS and polystyrene resins.

Whereas the copolyester of Example I which used ethylene glycol with the neopentyl glycol and phthalic anhydride with the aliphatic acids and the copolyester of Example III which contained no ethylene glycol and phthalic anhydride had comparable plasticization efficiency, resistance to migration and resistance to marring, significant processing improvements are obtained by the use of the plasticizers of this invention. To demonstrate these advantages, dry blend and fusion characteristics of the above formulations were determined using a torque rheometer (Brabender Plasticorder) in accordance with ASTM Designations D 2396-79 and D 2538-79, respectively. The powder mix (dry blending) evaluation was carried out at two different temperatures (100° C. and 85° C.) for comparison purposes. Both evaluations were run using 300 grams of the resin formulation using a sigma mixing head at 63 rpm. Dry blending results obtained for the resin formulations were as follows:

|  | Plasticizer of Ex. I | Plasticizer of Ex. III |
|---|---|---|
| Dry-Blending at 100° C.: | | |
| Time to Peak Torque (Minutes and Seconds) | 1'30" | 1'45" |
| Peak Torque (Meter-Grams) | 130 | 160 |
| Dry-Blending at 85° C.: | | |
| Time to Peak Torque (Minutes and Seconds) | 5'15" | 8'30" |
| Peak Torque (Meter-Grams) | 100 | 140 |

It is apparent from the above data that the product formulated utilizing the copolyester of Example I requires less time and lower torque (less work) to achieve dry blending. Higher throughputs are therefore possible with substantial energy savings using standard equipment and standard operating conditions. Also, as a result of the improved mixing ability it may be possible to accomplish dry-blending at lower operating temperatures.

Fusion characteristics for two resin formulations were determined using 70 grams of dry-blended material run using a No. 6 roller head at 170° C. and 31.5 rpm. Fusion time (time to peak fusion minus time to initial fusion) for the formulation containing the copolyester of Example III was 60 seconds whereas only 45 seconds were required to achieve fusion of the formulation plasticized with the copolyester of Example I. Thus, utilizing the copolyester products of this invention it is possible to increase the extrusion throughput and/or reduce the residence time and teerefore heat history of the formulation during the extrusion operation.

EXAMPLES V-IX

To demonstrate the versatility of the present invention and the ability to vary the composition of the copolyester plasticizers, additional reactions were carried out following the general procedure described for Example I. Types and amounts of reactants used and properties of the resulting copolyester products are reported in Table I. PVC formulations were prepared as described in Example I. Where determined, physical properties obtained for the plasticized resins are set forth in Table II.

TABLE I

|  | EX. V | EX. VI | EX. VII | EX. VIII | EX. IX |
|---|---|---|---|---|---|
| Reactants: | | | | | |
| Adipic Acid | 58.1 | 45.3 | 45.6 | 24.8 | 32.3 |
| Azelaic Acid | 6.9 | 53.0 | 5.2 | 24.8 | 3.7 |
| Phthalic Anhydride | — | 49.4 | 49.2 | 50.4 | 34.9 |
| Dimethyl Terephthalate | 35.0 | — | — | — | — |

TABLE I-continued

|  | EX. V | EX. VI | EX. VII | EX. VIII | EX. IX |
|---|---|---|---|---|---|
| Neopentyl Glycol | 27.8 | 36.8 | 26.2 | 35.0 | 50.0 |
| Ethylene Glycol | 47.1 | 34.4 | 44.7 | 35.0 | 50.0 |
| 2-Ethylhexanol | — | 28.8 | — | — | — |
| 2-Ethylhexanoic Acid | — | — | — | — | 29.1 |
| Isodecyl Alcohol | 25.1 | — | 29.1 | — | — |
| Isooctyl Alcohol | — | — | — | 30.0 | — |
| Properties: | | | | | |
| Acid Value | 0.2 | 0.8 | 0.4 | 0.5 | 0.8 |
| Hydroxyl Value | 9.0 | 13.8 | 0.9 | 11.4 | 17.3 |
| 100° F. Kinematic Viscosity (cSt) | 905 | 1170 | 775 | 989 | 1168 |

TABLE II

|  | EX. V | EX. VII | EX. VIII | EX. IX |
|---|---|---|---|---|
| Elongation (%) | 320 | 300 | 337 | 310 |
| 100% Modulus (psi) | 1625 | 1650 | 1650 | 1625 |
| Tensile Strength (psi) | 3400 | 3325 | 3475 | 3500 |
| Shore "A" Hardness | 85/80 | 83/79 | 83/79 | 82/77 |
| Roll Spew (5 hours at RT) | None | None | None | None |
| Brittle Point (°C.) | −17 | N.D. | −12 | N.D. |
| Extraction (percent weight loss): | | | | |
| Soapy Water (90° C.; 24 hours) | 3.4 | N.D. | 5.3 | N.D. |
| Oil (50° C.; 24 hours) | 2.0 | N.D. | 1.7 | N.D. |
| Hexane (25° C.; 24 hours) | 4.7 | N.D. | 2.3 | N.D. |

N.D. = not determined

EXAMPLE X

To further demonstrate the preparation of copolyester compositions derived from dimethyl terephthalate which exhibit superior resistance to marring of polystyrene and ABS resins, the following were reacted:

| Reactants | Equivalent Percent |
|---|---|
| Methyl Esters of Mixed Dicarboxylic Acids[1] | 48.7 |
| Dimethyl Terephthalate | 26.2 |
| Mixed Monocarboxylic Acids[2] | 25.1 |
| Neopentyl Glycol | 37.1 |
| Ethylene Glycol[3] | 62.9 |

[1] A commercially available co-product stream from the production of adipic acid containing approximately 76% dimethyl ester of glutaric acid and 24% dimethyl ester of adipic acid.
[2] 60% $C_8$ and 40% $C_{10}$ dicarboxylic acids.
[3] The charge included a 1.2-fold excess of hydroxyl component as ethylene glycol to aid in driving the reaction to completion.

The reactants were charged to the reactor and gradually heated to 223° C. 0.01 Weight percent 50% $H_3PO_2$ and 0.01 weight percent tin catalyst were added when the reaction mixture became clear (approx. 80° C.). First traces of methanol began condensing at about 180° C. When the rate of methanol evolution slowed, a vacuum was applied and gradually increased up to a maximum of 1.2 torr to remove final traces of methanol. The resulting copolyester (837 grams) had an acid value of 0.1, hydroxyl value of 16.4, and 100° F. kinematic viscosity of 1348 centistokes. The product was clear at room temperature and essentially colorless and was an effective plasticizer for PVC.

EXAMPLES XI–XIII

Example X was repeated with the following reactants:

| Reactants | Equivalent Percent | | |
|---|---|---|---|
| | EX. XI | EX. XII | EX. XIII |
| Methyl Esters of Mixed Dicarboxylic Acids | 65.0 | — | — |
| Adipic Acid | — | 58.1 | 65.0 |
| Azelaic Acid | — | 6.9 | — |
| Dimethyl Terephthalate | 35.0 | 35.0 | 35.0 |
| Neopentyl Glycol | 27.8 | 27.8 | 27.8 |
| Ethylene Glycol[1] | 47.1 | 47.1 | 47.1 |
| Isodecyl Alcohol[1] | 25.1 | 25.1 | 25.1 |

[1]The charge included 1.2-fold excesses of the volatile hydroxyl components (ethylene glycol and isodecyl alcohol) to aid in driving the reaction to completion.

The yield (grams), acid value, hydroxyl value, and 100° F. kinematic viscosity (centistokes) for each of the resulting products were as follows:

| | EX. XI | EX. XII | EX. XIII |
|---|---|---|---|
| Yield | 1097 | 993 | 1009 |
| Acid Value | 0.1 | 0.2 | 0.2 |
| Hydroxyl Value | 7.1 | 9.0 | 8.7 |
| Viscosity | 1280 | 905 | 975 |

EXAMPLE XIV

Whereas all of the products of this invention prepared in the foregoing examples are effective plasticizers for PVC and give acceptable results in the so-called "sandwich test" for marring (see U.S. Pat. No. 3,972,962, Example VIII), the products of Examples V and X–XIII prepared using dimethyl terephthalate in accordance with the preferred embodiment of this invention quite unexpectedly have significantly reduced affinity for polystyrene and ABS resins which is not evident from the "sandwich test." To demonstrate the markedly reduced affinity of the preferred copolyester compositions, a "dip test" was conducted using the copolyesters prepared in accordance with the foregoing examples. For the test, 100 ml beakers were filled with approximately 40 mls copolyester plasticizer. A single test specimen (1"×3") cut from either 100 mil thick compression molded commercially available unplasticized polystyrene (Mobil MX-7100A) or ABS was then placed in each beaker. Surfaces of the test strips were cleaned by wiping with isopropyl alcohol and a soft tissue prior to testing. The beakers containing the test specimens were then placed in an air-circulating oven at 150° F. for 16 hours. At the conclusion of the test period, the test strips were wiped with a soft tissue, visually inspected, and rated for mar. Any surface tackiness was also noted. Mar ratings range from 0 (no marring or dulling of surface) to 4 (severe marring of surface accompanied by tackiness). Results obtained were as follows:

| Copolyester of: | Mar Rating | |
|---|---|---|
| | Polystyrene | ABS |
| Ex. I | 2 | 3 |
| Ex. II | 2 | 3 |
| Ex. V | 0 | 0 |
| Ex. VI | 2 | 3 |
| Ex. VII | 2 | 3 |
| Ex. VIII | 2 | 3 |

-continued

| Copolyester of: | Mar Rating | |
|---|---|---|
| | Polystyrene | ABS |
| Ex. IX | 2 | 3 |
| Ex. X | 1 | 1 |
| Ex. XI | 0 | 0 |
| Ex. XII | 0 | 0 |
| Ex. XIII | 0 | 0 |

It is apparent from the above data that the copolyesters prepared using the dimethyl terephthalate have significantly reduced affinity for polystyrene and ABS resins than the copolyesters prepared using phthalic anhydride. This reduced affinity for polystyrene and ABS provides an extra margin of safety in constructions, such as for refrigerator gaskets, where plasticized PVC comes into contact with unplasticized polystyrene or ABS resins. This feature coupled with the improved processability and reduced cost of the copolyesters of the present invention makes these products particularly useful plasticizers for PVC.

We claim:

1. An improved copolyester plasticizer having an average molecular weight of 500° to 2000° and 100° F. kinematic viscosity of 600 to 2000 centistokes obtained by the reaction of (a) a mixture of a benzene dicarboxylic acid, anhydride or methyl ester thereof and an aliphatic saturated dicarboxylic acid having from 5 to 12 atoms or methyl ester thereof, said benzene dicarboxylic acid, anhydride or methyl ester being present in an amount from 40 to 60 equivalents percent, based on the total acid equivalents, and the aliphatic saturated dicarboxylic or methyl ester being present in an amount from 40 to 60 equivalent percent, based on the total acid equivalents, (b) a mixture of neopentyl glycol and ethylene glycol, said neopental glycol being present in an amount from 30 to 60 equivalent percent, based on the total alcohol equivalents, and said ethylene glycol being present in an amount from about 30 to 60 equivalent percent, based on the total alcohol equivalents, and (c) an aliphatic saturated monofunctional alcohol having from 6 to 13 carbon atoms or an aliphatic saturated monocarboxylic acid having from 6 to 13 carbon atoms or methyl ester thereof, said aliphatic saturated monofunctional alcohol or aliphatic saturated monocarboxylic acid being present in an amount from 8 to 30 equivalent percent, based on the total equivalents of alcohol or acid.

2. The improved copolyester plasticizer of claim 1 having a acid value less than 3 and hydroxyl value less than 25.

3. The improved copolyester plasticizer of claim 2 wherein (c) is an aliphatic saturated monofunctional alcohol containing from 8 to 10 carbon atoms.

4. The improved copolyester plasticizer of claim 3 wherein the aliphatic saturated monofunctional alcohol is selected from the group consisting of 2-ethylhexanol, isooctyl alcohol or isodecyl alcohol.

5. The improved copolyester plasticizer of claim 2 wherein (c) is an aliphatic saturated monocarboxylic acid containing from 8 to 10 carbon atoms.

6. The improved copolyester plasticizer of claim 2 wherein (a) is a mixture of phthalic anhydride and an aliphatic saturated dicarboxylic acid having from 5 to 9 carbon atoms or a mixture of $C_{5-9}$ aliphatic saturated dicarboxylic acids.

7. The improved copolyester plasticizer of claim 6 wherein (c) is an aliphatic saturated monofunctional alcohol containing from 8 to 10 carbon atoms.

8. The improved copolyester plasticizer of claim 7 wherein the aliphatic saturated monofunctional alcohol is selected from the group consisting of 2-ethylhexanol, isooctyl alcohol or isodecyl alcohol.

9. The improved copolyester plasticizer of claim 6 wherein (c) is an aliphatic saturated monocarboxylic acid containing from 8 to 10 carbon atoms.

10. The improved copolyester plasticizer of claim 2 wherein (a) is a mixture of dimethyl terephthalate and an aliphatic saturated dicarboxylic acid having from 5 to 9 carbon atoms or a mixture of $C_{5-9}$ aliphatic saturated dicarboxylic acids.

11. The improved copolyester plasticizer of claim 10 wherein the aliphatic saturated dicarboxylic acid is adipic acid, azelaic acid, or mixtures of adipic and azelaic acids.

12. The improved copolyester plasticizer of claim 10 wherein (c) is an aliphatic saturated monofunctional alcohol containing 8 to 10 carbon atoms.

13. The improved copolyester plasticizer of claim 12 wherein the aliphatic saturated monofunctional alcohol is selected from the group consisting of 2-ethylhexonal, isooctyl alcohol or isodecyl alcohol.

14. The improved copolyester plasticizer of claim 10 wherein (c) is an aliphatic saturated monocarboxylic acid containing from 8 to 10 carbon atoms.

15. The improved copolyester plasticizer of claim 2 wherein (a) is a mixture of dimethyl terephthalate and a methyl ester of an aliphatic saturated dicarboxylic acid having from 5 to 9 carbon atoms or a mixture of methyl esters of predominantly $C_{5-9}$ aliphatic saturated dicarboxylic acids.

16. The improved copolyester plasticizer of claim 15 wherein the methyl esters of aliphatic saturated dicarboxylic acids are mixtures obtained as a co-product stream from the production of adipic acid and comprised essentially of dimethyl glutarate and dimethyl adipate present in a ratio from 4:1 to 1:1.

17. The improved copolyester plasticizer of claim 15 wherein the methyl esters of the aliphatic saturated dicarboxylic acids are the methyl ester of adipic acid, azelaic acid, or mixtures of adipic and azelaic acids.

18. The improved copolyester plasticizer of claim 15 wherein (c) is an aliphatic saturated monofunctional alcohol containing 8 to 10 carbon atoms.

19. The improved copolyester plasticizer of claim 18 wherein the aliphatic saturated monofunctional alcohol is selected from the group consisting of 2-ethylhexanol, isooctyl alcohol or isodecyl alcohol.

20. The improved copolyester plasticizer of claim 15 wherein (c) is an aliphatic saturated monocarboxylic acid or methyl ester thereof containing from 8 to 10 carbon atoms.

* * * * *